United States Patent [19]

Matsuno et al.

[11] Patent Number: 5,737,714
[45] Date of Patent: Apr. 7, 1998

[54] TRACTION CONTROL SYSTEM FOR FOURWHEEL DRIVE VEHICLE

[75] Inventors: Koji Matsuno, Azami; Saiichiro Oshita, Ota, both of Japan

[73] Assignee: Fuji Jukogyo Kabushiki Kaisha, Tokyo, Japan

[21] Appl. No.: 588,019

[22] Filed: Jan. 17, 1996

[30] Foreign Application Priority Data

Jan. 31, 1995 [JP] Japan ................. 7-014286

[51] Int. Cl.$^6$ ................................ B60K 17/348
[52] U.S. Cl. ............... 701/89; 701/84; 701/88; 701/90; 180/197; 180/248
[58] Field of Search .................. 701/82, 83, 84, 701/88, 89, 90; 180/197, 244, 248, 249

[56] References Cited

U.S. PATENT DOCUMENTS

| | | | |
|---|---|---|---|
| 4,763,262 | 8/1988 | Leiber | 701/90 |
| 4,989,686 | 2/1991 | Miller et al. | 701/88 |
| 5,097,921 | 3/1992 | Tezuka | 701/89 |
| 5,132,908 | 7/1992 | Eto et al. | 701/89 |
| 5,164,903 | 11/1992 | Lin et al. | 701/89 |
| 5,168,955 | 12/1992 | Naito | 701/89 |
| 5,251,719 | 10/1993 | Eto et al. | 701/89 |
| 5,497,333 | 3/1996 | Sasaki | 701/84 |

FOREIGN PATENT DOCUMENTS 6460429  3/1989  Japan.

*Primary Examiner*—Gary Chin
*Attorney, Agent, or Firm*—Martin A. Farber

[57] ABSTRACT

A traction control system for a fourwheel drive vehicle having a center differential comprises a brake pressure control apparatus, an engine output control apparatus, a differential limiting torque control apparatus, vehicle speed calculating means for calculating a reference vehicle speed of a vehicle, slip amount calculating means for calculating a slip amount of each wheel, target slip amount determining means for determining a front target slip amount of front wheels and a rear target slip amount of rear wheels, traction control determining means for determining to operate a traction control when the slip amount of the front wheels exceeds the front target slip amount or when the slip amount of the rear wheels exceeds the rear target slip amount, brake pressure calculating means for calculating a brake pressure so as to apply a brake to the wheels and engine output calculating means for calculating a target engine torque corresponding to a difference between the slip amount and the target slip amount, whereby driving force and side force of the vehicle is properly controlled and the vehicle can be prevented from spins under any driving conditions.

6 Claims, 12 Drawing Sheets

FIG. 9a
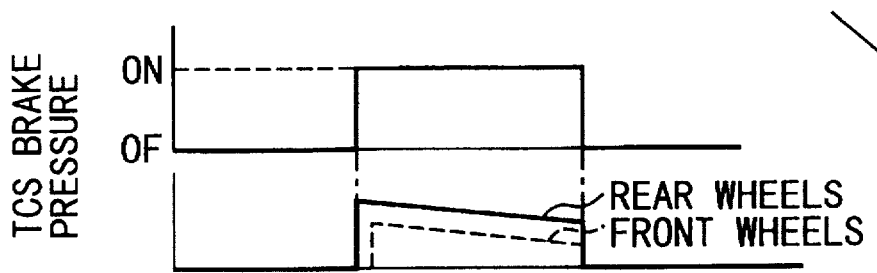
FIG. 9b
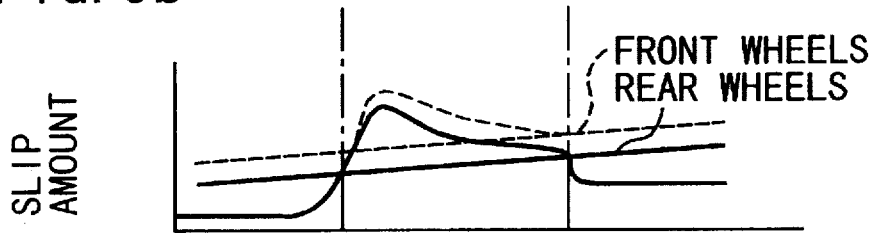
FIG. 9c
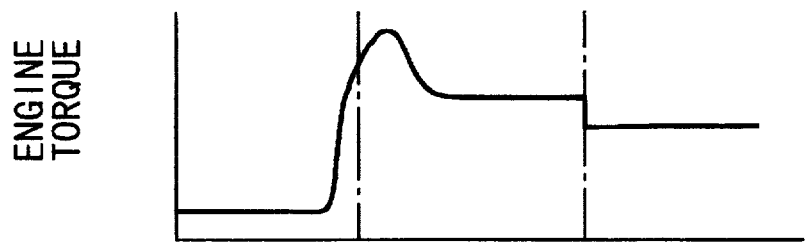
FIG. 9d
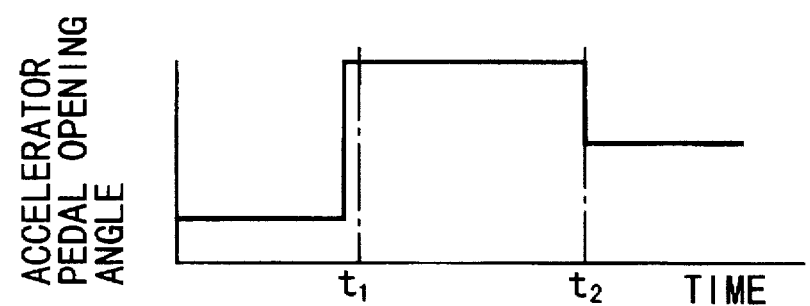
FIG. 9

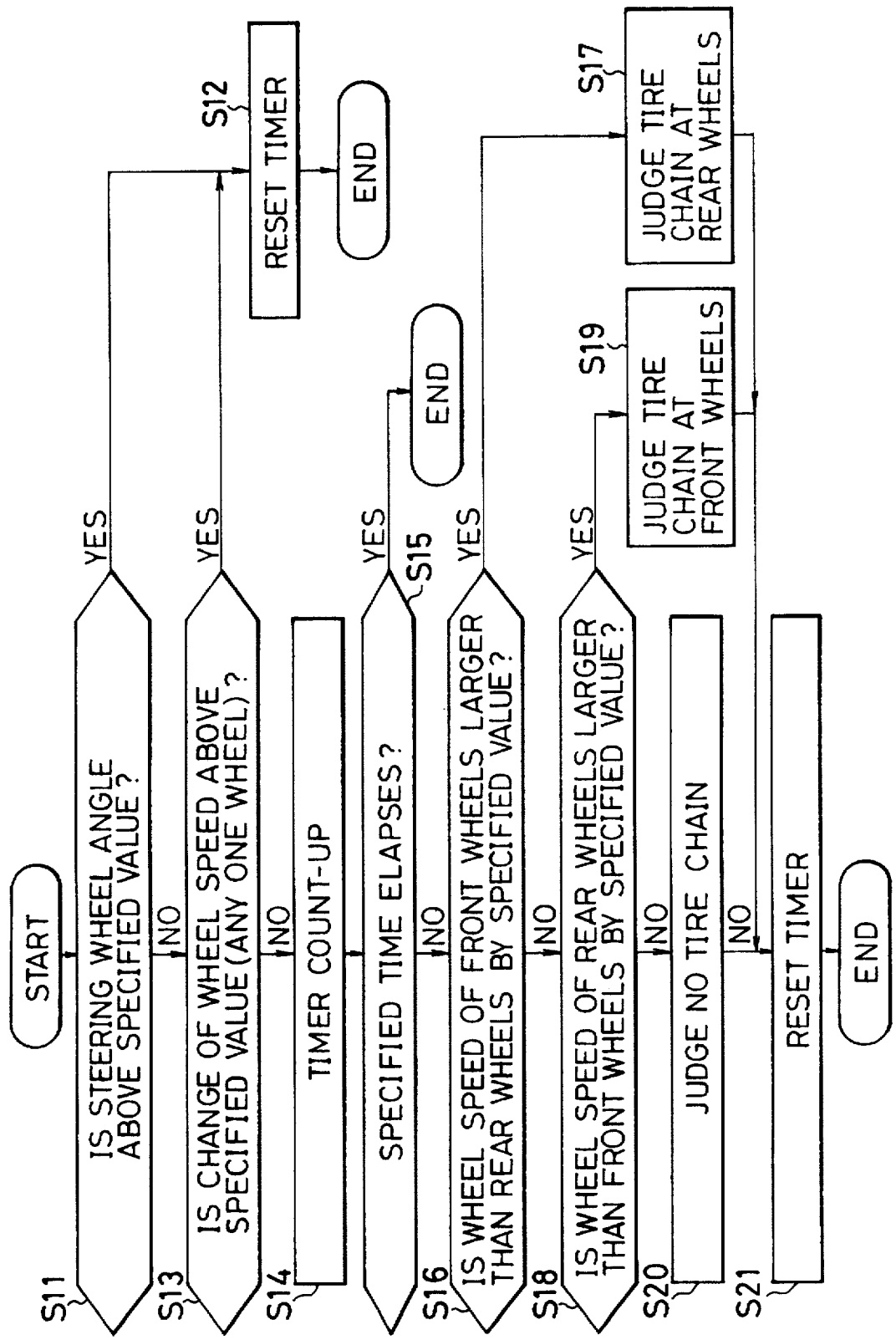

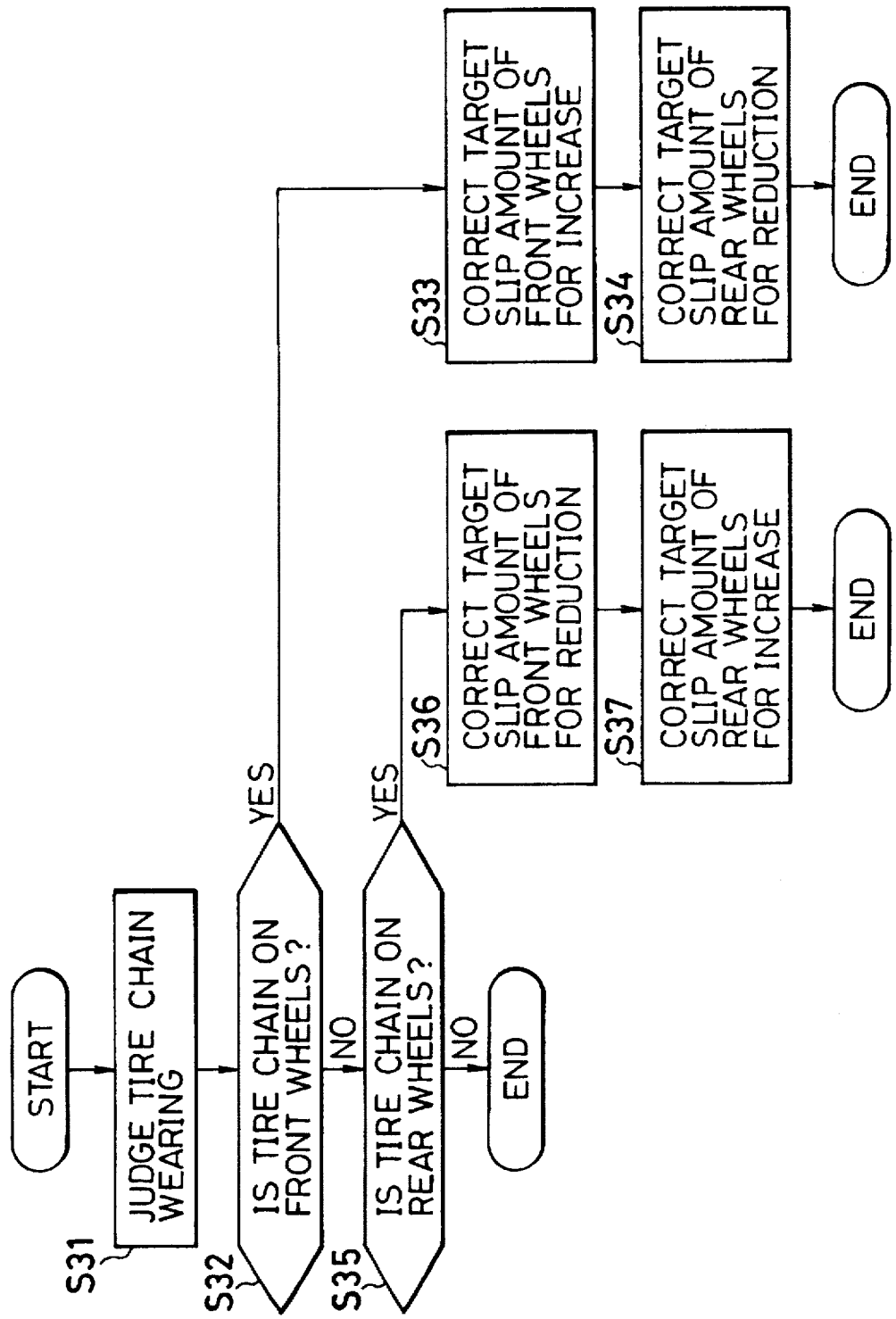

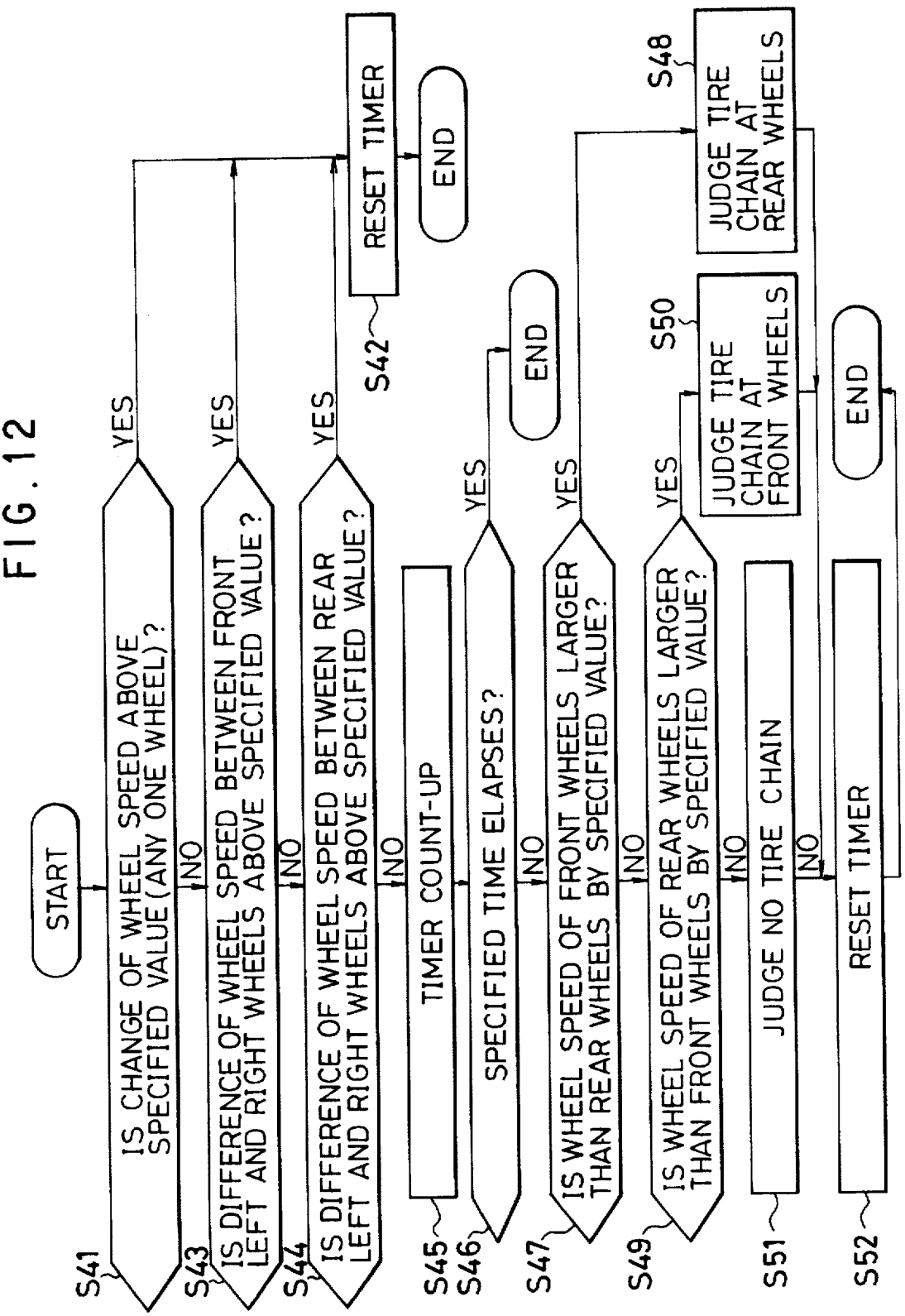

TRACTION CONTROL SYSTEM FOR FOURWHEEL DRIVE VEHICLE

BACKGROUND OF THE INVENTION

1. Field of the Invention

The present invention relates to a traction control system (TCS) for a fourwheel drive vehicle having a center differential and particularly to a traction control system for separately controlling driving forces of four wheels mainly by a brake control.

2. Prior Arts

In general, when a vehicle causes a slip in a driving wheel while a driving force is applied thereto, a side force of a tire is reduced according to an increase of the slip rate and the vehicle tends to slip sidewise. A fourwheel drive system is a drive system in which the driving force is distributed into four wheels differently from a twowheel drive system with a driving force concentrated on either front or rear wheels. Therefore, since the driving force applied to the front wheels is small compared to a front wheel drive vehicle and the driving force applied to the rear wheels is small compared to a rear wheel drive vehicle, the fourwheel drive vehicle has a margin in the grip force of the front and rear wheels. That is to say, the fourwheel drive vehicle has an advantage that it is hard to cause slips compared to the front wheel drive or rear wheel drive vehicle. Further, the fourwheel drive vehicle has an enough margin in the side force of tires. Especially, since rear tires act as securing a directional stability of the vehicle, the greater grip force of the rear wheels provides the vehicle with a good straight-line stability.

A full-time fourwheel drive vehicle equipped with the center differential can make smooth turns in the fourwheel drive condition with the help of the center differential. An advantage of the center differential is a capability of discretionally distributing the driving force between front and rear wheels. If the torque distribution is established properly, an under-steer tendency produced by the driving force of the front wheels during cornering cancels an over-steer tendency produced by the driving force of the rear wheels and as a result a neutral steering characteristic can be obtained. It is also possible to choose a favorite steering characteristic by changing the distribution ratio of torque between front and rear wheels.

However, even the full-time fourwheel drive vehicle equipped with the center differential has a problem in case where a wheel is detached from ground or where a wheel is in a slippery mud. Under these condition the very wheel causes a slip and a maneuverability and escapeability of the vehicle are spoiled to a great extent. To avoid this, generally a direct coupling mechanism of front and rear wheels which is manually operated or a differential limiting mechanism such as a viscous coupling, a hydraulically operated multiple disc clutch and the like are incorporated into the fourwheel drive vehicle with the center differential.

On the other hand, in case where front and rear wheels of one side cause a slip on a road with a low friction coefficients surface and front and rear wheels of other side run on a road with a normal friction coefficients surface, this direct coupling mechanism is ineffective. Further, in an extreme case four wheels go into a slip simultaneously, and as a result, the stability and handlingability of the vehicle are largely degraded.

Consequently, in order to secure the maneuverability and running stability of the vehicle in any operating conditions and to raise the vehicle performance in a marginal condition, it is effective to introduce a traction control into the fourwheel drive vehicle.

For example, Japanese Unexamined Patent Application Toku-Kai-Sho 64-60429 discloses a technique in which a brake force is applied to each wheel when a slip occurs and a throttle control means reduces the engine output when a spin occurs.

However, in this prior technique, since the detection of slip and spin is performed without discriminating between front and rear wheels, the technique is still insufficient to raise the vehicle stability. Further, in this prior technique, since the way of detecting a slip is based on the detection of the angular acceleration of the wheel without using a longitudinal acceleration sensor, the accuracy of the slip detection on a slippery road is insufficient.

SUMMARY OF THE INVENTION

Accordingly, the present invention is intended to obviate the aforementioned defects and disadvantages of the prior art and it is summarized as follows.

It is an object of the present invention to provide a traction control system for a full-time fourwheel drive vehicle with a center differential having a versus-spin stability under any driving conditions by means of properly controlling driving force and side force.

In order to achieve this object, the traction control system according to the present invention comprises:

a brake pressure control apparatus;

an engine output control apparatus;

a differential limiting torque control apparatus;

vehicle speed calculating means for calculating a reference vehicle speed of a vehicle based on a lowest wheel speed in wheels and a logitudinal acceleration of the vehicle;

slip amount calculating means for calculating a slip amount of each wheel based on the reference vehicle speed and a wheel speed of each wheel;

target slip amount determining means for determining a front target slip amount of front wheels and a rear target slip amount of rear wheels according to the reference vehicle speed;

traction control determining means for determining to operate a traction control when the slip amount of the front wheels exceeds the front target slip amount or when the slip amount of the rear wheels exceeds the rear target slip amount and for outputting a traction control signal;

brake pressure calculating means responsive to the traction control signal for calculating a brake pressure corresponding to a difference between the slip amount and the target slip amount, for outputting a brake pressure signal to the brake pressure control apparatus so as to apply a brake to the wheels and for outputting a signal to eliminate a differential limiting torque to the differential limiting torque control apparatus; and engine output calculating means provided in the control unit responsive to the traction control signal for calculating a target engine torque corresponding to a difference between the slip amount and the target slip amount and for outputting a target engine torque signal to the engine output control apparatus.

BRIEF DESCRIPTION OF THE DRAWINGS

A specific embodiment of the present invention will be described with reference to the accompanying drawings, in which:

FIG. 9 is a diagrammatic chart versus time showing operations of control data according to the present invention;

FIG. 10 is a flowchart for judging a tire chain wearing on front or rear wheels according to the present invention;

FIG. 11 is a flowchart for correcting a target slip amount on front and rear wheels when a tire chain is wore; and FIG. 12 is a flowchart for judging a tire chain wearing on front and rear wheels according to the present invention.

DETAILED DESCRIPTION OF THE INVENTION

Figure 1:
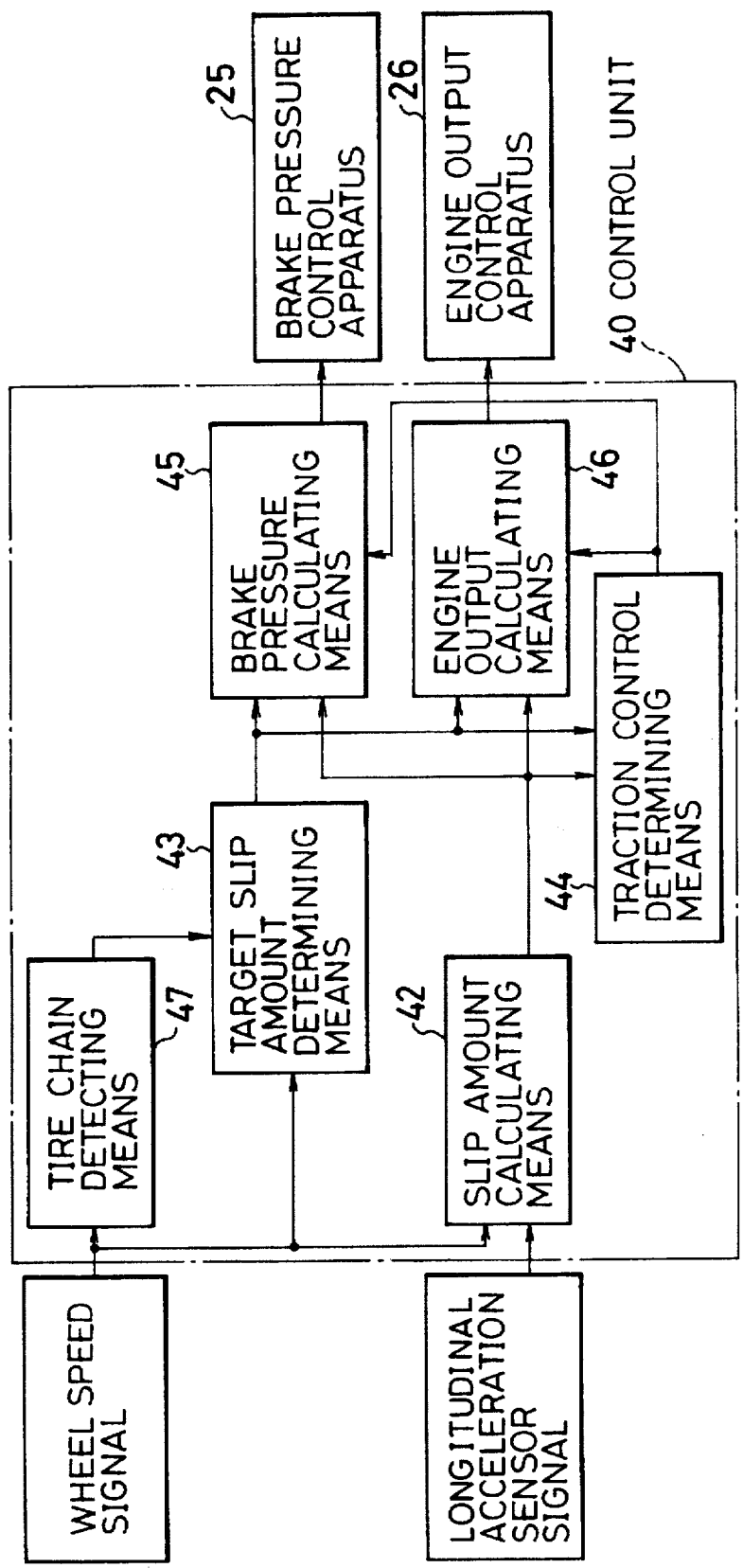
FIG. 1 is a basic block diagram showing a control unit of a first embodiment.
Figure 2:
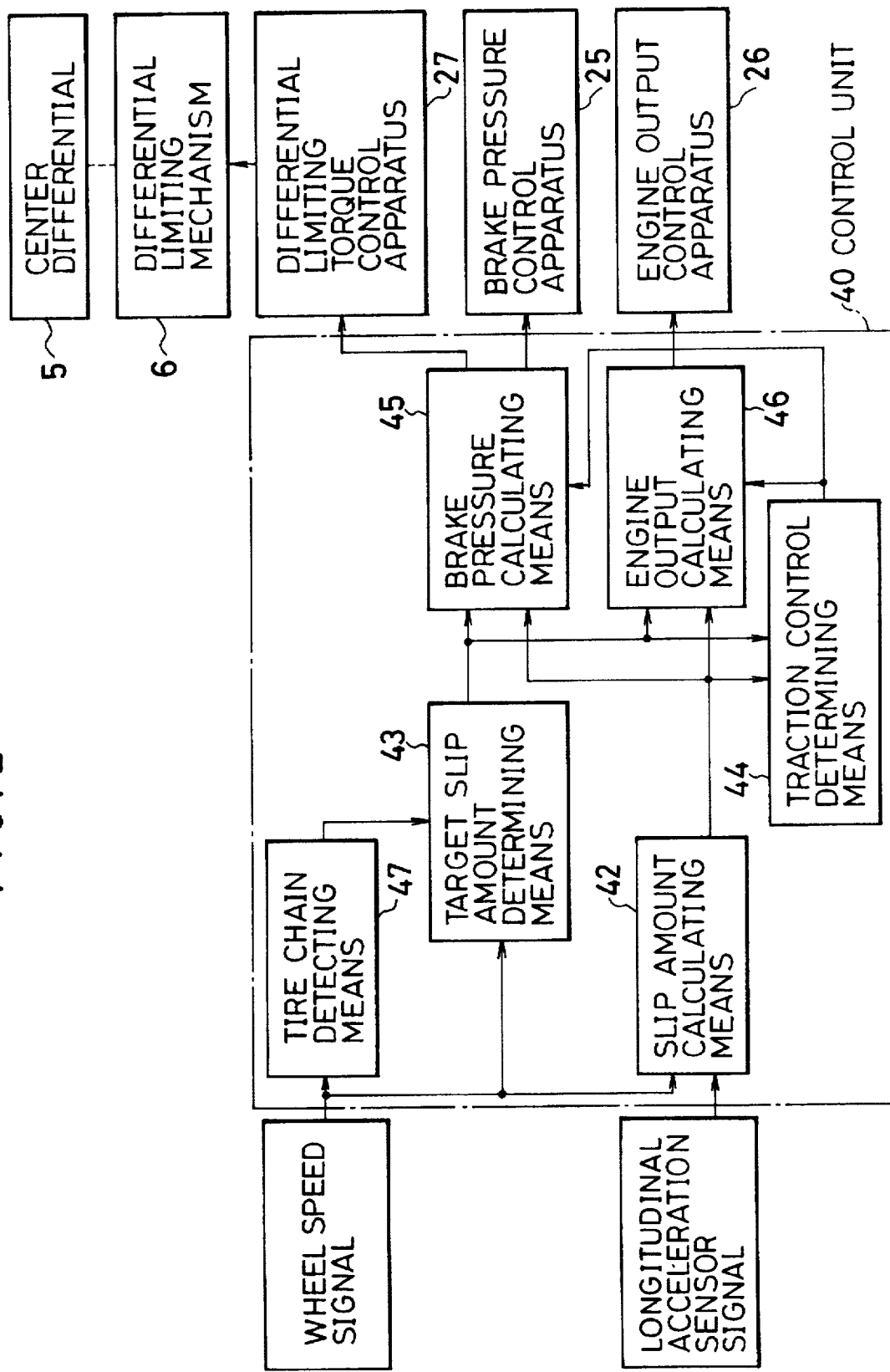
FIG. 2 is a basic block diagram showing a control unit of a second embodiment.
Figure 3:
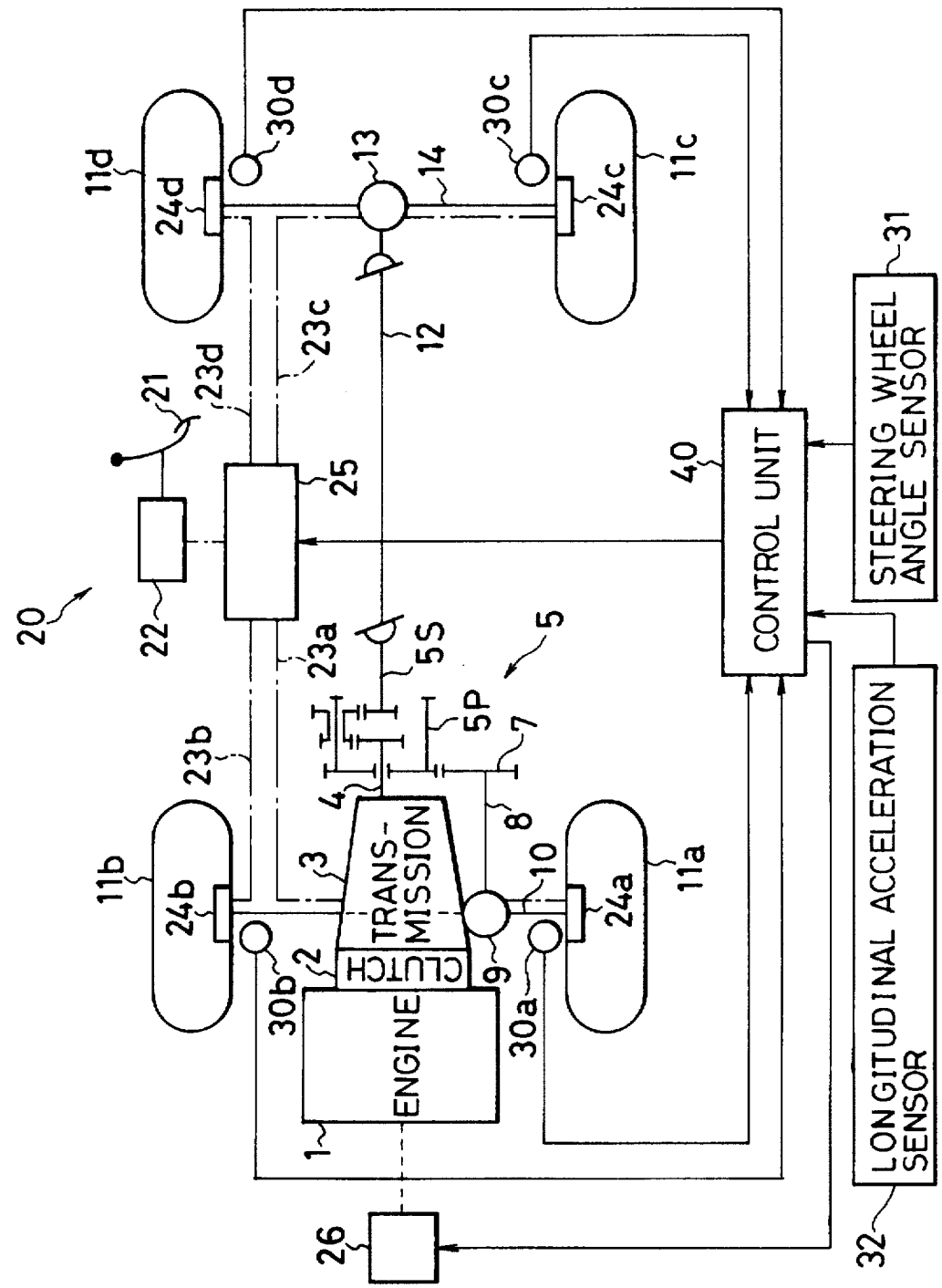
FIG. 3 is a schematic diagram showing a control system according to a first embodiment of the present invention.
Figure 4:
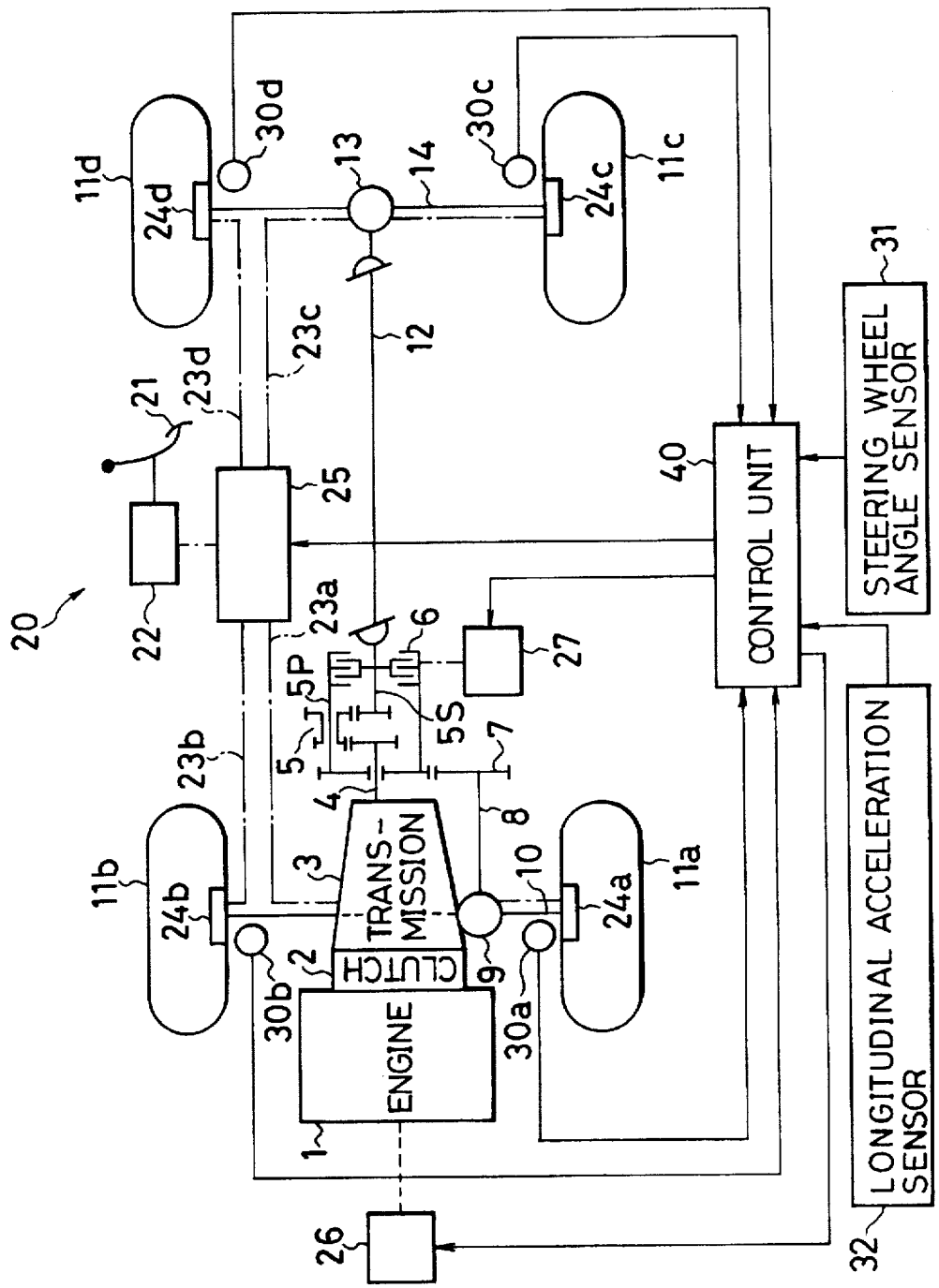
FIG. 4 is a schematic diagram showing a control system according to a second embodiment of the present invention.

FIG. 3 indicates a schematic diagram of a traction control system for a fourwheel drive vehicle according to a first embodiment and FIG. 4 presents a schematic diagram of the system according to a second embodiment. Numeral 1 denotes an engine whose torque is transmitted to a center differential 5 through a clutch 2, a transmission 3. The center differential 5 has combined planetary gears and distributes an equal torque or an unequal torque to front and rear wheels.

According to the first embodiment, a pinion shaft 5P of the center differential 5 is connected with a left front wheel 11a and a right front wheel 11b through a reduction gear 7, a front drive shaft 8, a front differential 9 and a front axle shaft 10 and an output shaft 5S of the center differential 5 is connected with a left rear wheel and a right rear wheel 11d through a propeller shaft 12, a rear differential 13 and a rear axle shaft 14.

Further, according to the second embodiment, a differential limiting mechanism 6 (in this embodiment, a hydraulically operated multiple-disc clutch) is interposed between the pinion shaft 5P of the center differential 5 and the output shaft or the sun gear shaft 5S of the center differential 5 so as to enable a free transfer of torque between front and rear wheels.

The engine 1 includes an engine output control apparatus 26 for forcedly reducing engine output by means of a throttle control, a fuel cut, a reduction of charge pressure and the like. The differential limiting mechanism 6 is connected with a differential limiting torque control apparatus 27 for controlling differential limiting torque of the center differential 5 or for locking the differential operation of the center differential 5.

A brake system 20 comprises a brake pedal 21, a master cylinder 22 and a brake pressure control apparatus 25 for controlling brake pressure applied to each of four wheels. The brake pressure control apparatus 25 includes a pressure source, a pressure reduction valve and a pressure increase valve therein. Brake pipes 23a, 23b, 23c and 23d are connected with wheel cylinders 24a, 24b, 24c and 24d for the four wheels 11a, 11b, 11c and 11d respectively. Brake pressure produced by the pedal operation of a driver is automatically controlled by the pressure reduction valve or the pressure increase valve and is transmitted to the wheel cylinders 24a, 24b, 24c and 24d for braking.

Wheel speed sensors 30a, 30b, 30c and 30d are provided in the wheels 11a, 11b, 11c and 11d respectively for detecting wheel speed $\omega$ of each wheel. Further, a longitudinal acceleration sensor 32 is provided in the vehicle for calculating vehicle speed at the time when the four wheels slip simultaneously. Further, in case of a fourth embodiment described hereinafter a steering wheel angle sensor 31 is provided for judging whether or not wheels wear a tire chain. Signals from these sensors are inputted to a control unit 40 for being electronically processed therein. From the control unit 40, an engine control signal is outputted to the engine output control apparatus 26 and a brake control signal is outputted to the brake control apparatus 25. Further, in the second embodiment, a differential limiting torque signal is outputted to the differential limiting torque control apparatus 27. In the embodiments according to the present invention, the control unit 40 serves as controlling an ABS control.

Next, a function of the control unit 40 will be described.

Figure 6:
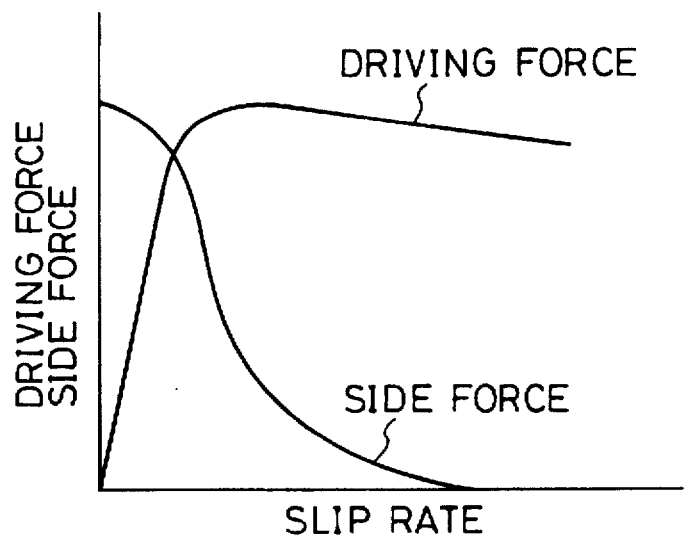
FIG. 6 is a diagram showing characteristics of a tire.

Generally, the traction force generated by a tire has a certain limitation according to frictional force and therefore, as shown in FIG. 6, when the slip rate is increased and the driving force is increased, the side force (a force applied sidewise during turning) is reduced. The vehicle behavior such as spin and drift-out is determined according to the magnitude of the side force for front and rear wheels. That is to say, in a case where the slip rate of the rear wheels is large and their side force is short, the vehicle causes a spin with the tail of the vehicle swinged outward. To remedy this phenomenon, the driver must turn a steering wheel in an opposite direction to the turning direction and this behavior of the vehicle is undesirable from the viewpoint of the stability and handlingability.

On the other hand, in a case where the slip rate of the front wheels is large and their side force is short, the vehicle causes a drift-out with the head of the vehicle swinged outward. To remedy this, the driver just slides the steering wheel through the hands in the turning direction. In this case, since the grip force of the rear wheels has a larger leeway than that of the front wheels has, it can be said that the vehicle has a good straight-line stability. Therefore, the traction control can be realized by making a brake control to four wheels such that the slip rate of the rear wheels is always smaller than that of the front wheels.

Figure 5:
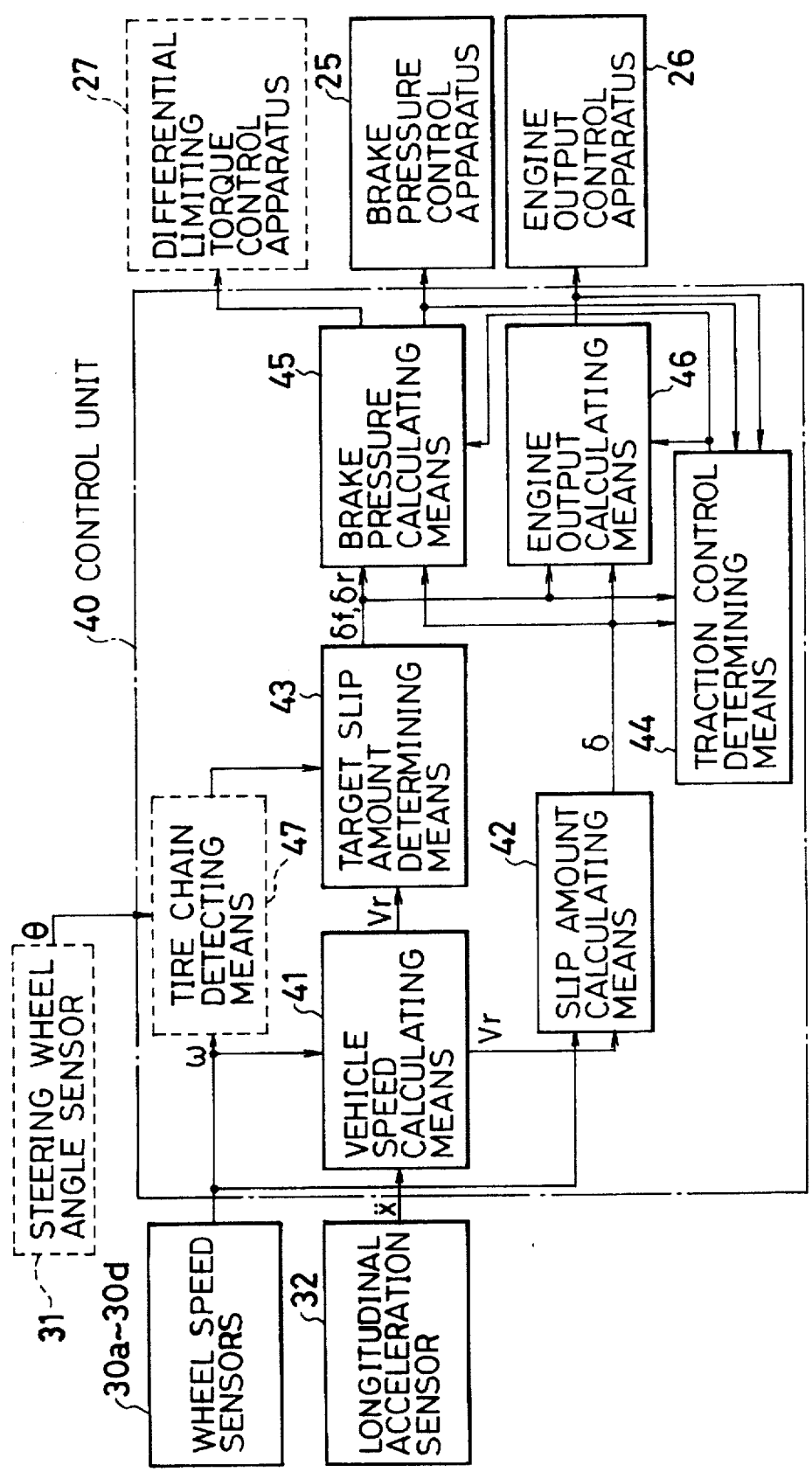
FIG. 5 is a detailed block diagram showing compositions of means according to the present invention.

Referring to FIG. 5, the control unit 40 includes a vehicle speed calculating means 41 for calculating a reference vehicle speed Vr of the fourwheel drive vehicle based on a wheel speed $\omega$ for each of four wheels and a longitudinal acceleration. For example, first, a wheel having a largest grip, namely, a wheel having a lowest wheel speed which is nearest to the vehicle speed, is selected. Next, the variation of the wheel speed $\omega$ of the selected wheel is compared with the longitudinal acceleration x of the vehicle and either one is added to the previous reference speed in order. Then, the added value is compared with the present lowest wheel speed and either one is let to be a present reference vehicle speed Vr.

The wheel speed $\omega$ of four wheels and the reference vehicle speed Vr are inputted to a slip amount calculating means 42 in which an actual slip amount $\delta$ for four wheels is calculated by reducing the reference vehicle speed Vr from the wheel speed $\omega$. As indicated in a tire characteristics diagram of FIG. 6, driving force is generated by some extent of slip rate. Further, side force is reduced according to an increase of slip rate. In the embodiments of the present invention, the slip amount $\delta$ is used in place of the slip rate for simplifying calculation because the slip amount $\delta$ is obtained by reducing the reference vehicle speed Vr from the wheel speed $\omega$.

Figure 7A:
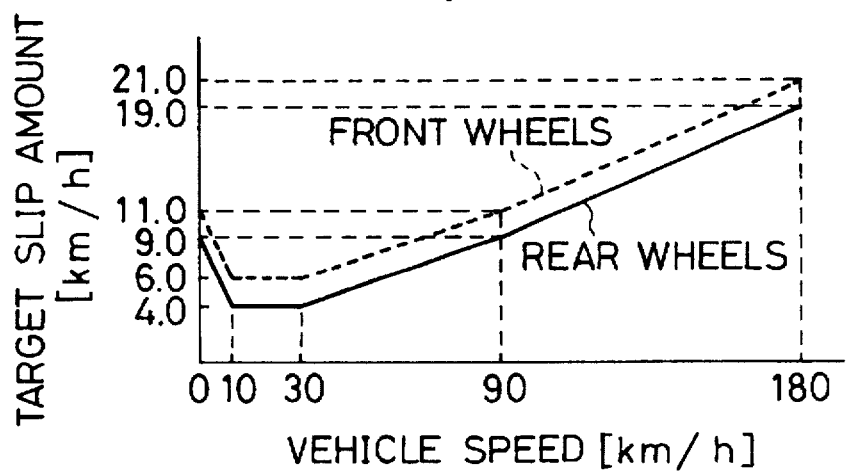
FIG. 7a is a diagrammatic chart showing a target slip amount of front and rear wheels versus vehicle speeds when no tire is wore.

The reference vehicle speed Vr is inputted to a target slip amount determining means 43 in which target slip amounts $\delta f$, $\delta r$ are determined for front and rear wheels respectively. The lowest slip amount needed for the traction control are predetermined as shown in FIG. 7a, for example more than 4.0 km/h. The target slip amount is determined according to the vehicle speed as shown in FIG. 7a. That is, at low speed the target slip amount is determined to be high, considering the greater difference of wheel speed among four wheels at the tight cornering and the accuracy of the wheel speed sensor. The target slip amount is determined to be low but at the medium speed and more it becomes large in accordance with an increase of the reference vehicle speed Vr so as to render the slip rate constant.

Further, in order to improve the stability of the vehicle when a spin occurs during the traction control, the target slip amount $\delta r$ of the rear wheels is determined to be lower than the target slip amount $\delta f$ of the front, as shown in FIG. 7a. The target slip amounts $\delta f$, $\delta r$ of front and rear wheels are determined by referring to a map as shown in FIG. 7a.

These slip amounts $\delta$ of four wheels and target slip amounts $\delta f$, $\delta r$ of front and rear wheels are inputted to a traction control determining means 44 where it is determined that the traction control is to be operated when any one of the slip amounts $\delta$ of the four wheels exceeds the target slip amounts $\delta f$, $\delta r$. Further, when any of the slip amounts $\delta$ is below the target slip amounts and brake pressure becomes zero for all wheels, it is determined that the traction control is to be terminated when the engine output is returned to the normal condition.

The traction control determination signal, the target slip amounts $\delta f$, $\delta r$ and the actual slip amount $\delta$ are inputted to the brake pressure calculating means 45 and an engine output calculating means 46. When the traction control is operative, the brake pressure calculating means 45 calculates a deviation between the target slip amount $\delta f$ of the front wheels and the slip amounts $\delta$ of the left and right front wheels and then calculates a deviation between the target slip amount $\delta r$ of the rear wheels and the slip amounts $\delta$ of the left and right rear wheels. According to these deviations of four wheels, a target brake pressure Pb is calculated individually for each wheel. Further, when the slip amount $\delta$ becomes small, it is determined that the brake pressure is to be reduced and a brake pressure reduction signal is outputted to the brake pressure control apparatus 25. In the second embodiment, the brake pressure calculating means 45 outputs a signal to deduce differential limiting torque to almost zero.

In the engine output calculating means 46, when the traction control is operative, with respect to the wheel with the highest wheel speed, the target slip amount $\delta f$ or $\delta r$ is compared with the slip rate $\delta$ and the deviation is obtained. Here, a target engine torque Te is calculated by reducing the engine torque by the amount of the deviation. When the slip amount $\delta$ becomes small, the engine output increase signal is outputted to the engine output control apparatus 26.

Next, an operation of the embodiments according to the present invention will be described.

In the normal operation of the vehicle, the driver controls engine output by the accelerator pedal and engine output is divided into two by the center differential 5. One output is transmitted to the front left and right wheels 11a, 11b respectively and the other one is transmitted to the rear left and right wheels 11c, 11d respectively. Thus, four wheels are driven by the four wheel power train system.

On the other hand, when the vehicle turns by the operation of the steering wheel, the turning locus of four wheels are different from each other and as a result the rotational difference is caused among these four wheels. However, each rotational difference between the front left and right wheels and between the rear left and right wheels is absorbed by the front differential 9 and the rear differential 13 respectively. Further, the rotational difference between the front drive shaft 8 and the rear drive shaft 5S is absorbed by the center differential 5. Generally, the engagement of the center differential 5 is free or in a weak relationship.

In the brake system 20, the master cylinder 22 is connected with the wheel cylinders 24a, 24b, 24c and 24d respectively. When the driver operates the brake pedal brake pressure is applied to the wheel cylinders 24a, 24b, 24c and 24d through the master cylinder 22 and the wheels 11a, 11b, 11c and 11d are braked.

Figure 8:
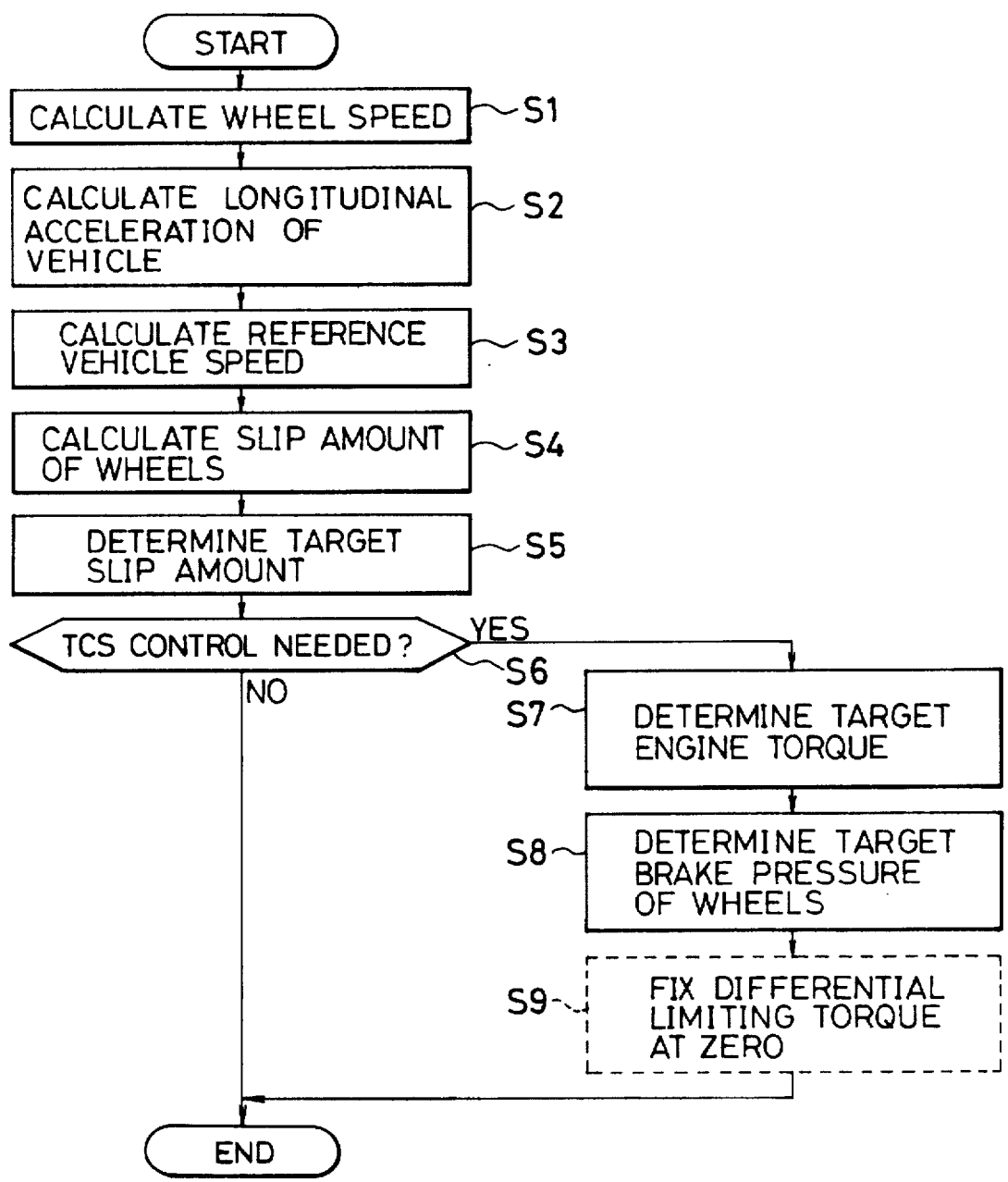
FIG. 8 is a flowchart of a traction control according to a first and second embodiments of the present invention.

Next, the traction control in the fourwheel drive is described by referring to a flowchart shown in FIG. 8.

First, at S1 the wheel speed $\omega$ is detected for each of four wheels and at S2 the vehicular lateral acceleration is detected. Then, at S3 the vehicle reference speed Vr is calculated based on the lowest wheel speed and the vehicular lateral acceleration. After that, the program goes to S4 where the slip amount d is calculated for each wheel by reducing the reference speed Vr from each wheel speed $\omega$. At the next step S5, the target slip amount $\delta f$, $\delta r$ of the front and rear wheels respectively are determined according to the running condition by referring to a map as shown in FIG. 7a. The program steps to S6 where it is judged whether or not the traction control is needed by comparing the slip amount $\delta f$, $\delta r$ with the slip amount $\delta$ for each wheel respectively.

When the vehicle runs on a road with high friction coefficients road surface and when drive torque is not larger than needed, the four wheels generate necessary drive force with an enough grip force within a range of a small slip amount $\delta$. In this case, the slip amount $\delta$ is sufficiently smaller than the target slip amount $\delta f$, $\delta r$ and it is determined that the traction control is not needed.

On the other hand, engine output becomes excessively large by driver's accelerator pedal work, or when the road friction is lowered for example because of snowy road, the vehicle wheels tend to slip because drive force comes near to a limit of the friction coefficients of road surface. As shown in FIG. 9, when any slip amount d of four wheels exceeds the target slip amount $\delta f$, $\delta r$ at a time t1, it is judged that the traction control is needed. In this case, the program goes from S6 to S7 where the reduced target engine torque Te is determined and a signal of this target engine torque Te is outputted to the engine output control apparatus 26 for reducing engine output forcedly.

Further, at S8 the target brake pressure Pb is determined so as to be higher for the rear wheels and lower for the front wheels and this brake pressure signal is outputted to the brake pressure control apparatus 25. In the brake pressure control apparatus 25, the pressure increase valve and the pressure reduction valve are controlled such that a strong brake is applied to the rear wheels and a weak brake is applied to the front wheels, whereby drive force of slipping wheels is restricted.

In the second embodiment, when differential limiting torque of the center differential 5 is large, the front axle 10 or the rear axle 14 is restricted to rotate independently. At S9 differential Limiting torque is fixed at zero or near zero. Then, since the effect of differential limiting torque is eliminated and any rotational difference is allowed, drive force and rotation of four wheels 11a, 11b, 11c and 11d are controlled by the brake control with high accuracy.

Thus, the traction control is performed such that the slip amount δ is reduced by lowering engine output forcedly and restricting drive force of slipping wheels by means of the brake control. The slip amount δ is controlled so as to follow up the target slip amount δf, δr of a map as indicated in FIG. 7a. According to the map, for example, the slip rate is constant at medium and higher speed. As shown in FIG. 9, a strong brake is applied to the rear wheels and a weak brake is applied to the front wheels, thereby the rear wheels have less slip amount than the front wheels do. That is, a more leeway of the grip force is generated at the rear wheels 11c and 11d than at the front wheels 11a and 11b.

When two wheels of one side of the vehicle slip, the traction control is operated such that the slip amounts of these wheels are reduced and the vehicle can escape from spinning. In a straight running condition, the vehicle can retain a straight-line stability due to the large grip force of the rear wheels 11c and 11d. When the vehicle makes a turn, the large side force of the rear wheels 11c and 11d prevents the vehicle from spinning. Then, the front wheels 11a and 11b have a large slip amount and as a result the head of the vehicle swings outward due to the reduced side force of the front wheels. To correct this, the driver can turn the vehicle safely by sliding the steering wheel through the hands in the turning direction. Thus, an excellent vehicle stability can be acquired.

When the driver releases the accelerator pedal at a time t2 as shown in FIG. 9, the slip amount becomes small instantly. Brake pressure becomes zero and engine output restores a normal condition. At this moment, it is judged that the traction control is needless and the vehicle operation is returned to a normal fourwheel drive condition.

Next, a tire chain wearing judgement control of the third embodiment according to the present invention will be described. Referring to FIG. 5, the control unit 40 includes a tire chain detecting means 47 for judging whether a wheel wears a tire chain or not and what tire wears the tire chain by the state of front and rear wheels at a straight-line running based on a wheel speed ω and a steering angle θ of the steering angle sensor 31. A signal of the tire chain wearing judgement is inputted to the target slip amount determining means 43 where the target slip amounts δf, δr are corrected according to the change of tire characteristics when a tire chain is worn.

Figure 7B:
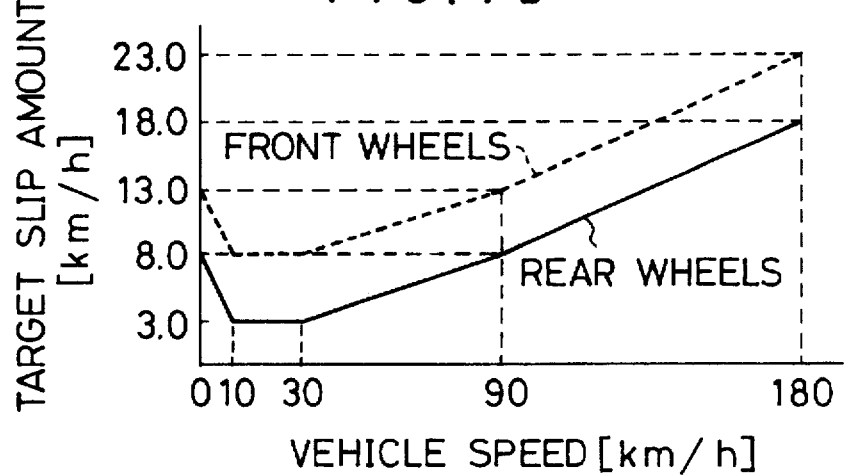
FIG. 7b is a diagrammatic chart showing a target slip amount of front and rear wheels versus vehicle speeds when a vehicle wears a tire chain on front wheels.

That is to say, the tire wearing a tire chain has a large grip force and the tire not wearing a tire chain has a far smaller grip force. To correct this, either the slip amount of the tire wearing the tire chain is to be increased or the slip amount of the tire not wearing tire chain is to be reduced or both of these means so as to balance the side force of the wearing tire with that of the non-wearing tire. For example, the target slip amounts δf, δr are determined according to the amended map as shown in FIG. 7b. Since this embodiment is the same as the first or second embodiment except for this, further explanation is omitted.

Next, this tire chin wearing judgment control will be described in reference to a flowchart shown in FIG. 10.

First, at S11 it is judged whether or not the vehicle runs straight by comparing the steering angle θ with a specified value and if the steering angle θ is larger than the specified value the program goes to S12 where the timer is reset. If the steering angle θ is smaller than the specified value, the routine steps to S13 where it is judged whether or not the vehicle is running with a normal grip by comparing the change of the wheel speed of four wheels with a specified value. If any one wheel produces a change of wheel speed by more than a specified value, the routine goes to S12 where the timer is reset. If the change of wheel speed is below the specified value for all four wheels, this indicates a running with a normal grip and the routine goes to S14 at which the timer is counted up.

Then, the routine goes to S15 where elapsed time is checked. If a specified time elapses, the routine goes to S16 where it is judged whether or not the rear wheels wear a tire chain. If the rear wheels wear a tire chain, the wheel speed of the front wheels is always higher than that of the rear wheels by a specified value or more because the diameter of the rear wheel becomes large due to the tire chain, then the routine is diverted to S17 where it is judged that the rear wheels wear a tire chain.

In case where the wheel speed of both wheels is approximately equal, or where the wheel speed of the rear wheels is higher, than that of the front wheels by a specified value or more, the routine goes to S18 in which it is judged whether or not the front wheels wear a tire chain by the difference of wheel speed. If the wheel speed of the rear wheels is higher than that of the front wheels by a specified value or more, the routine is diverted to S19 in which it is judged that the front wheels wear a tire chain. If the both wheel speed is almost the same, the routine goes to S20 where it is judged that no tire chain is worn at any wheel and at S21 the timer is reset. Thus, the tire chain wearing condition is judged when the vehicle runs in a straight-line condition for a specified time.

Next, a variation of the third embodiment or a fourth embodiment according to the present invention will be described. This variation is related to a method of judging the tire chain wearing only by wheel speed. Referring to a flowchart shown in FIG. 12, first at S41, it is judged whether or not the vehicle runs in a normal grip condition by comparing a change of wheel speed of four wheels with a specified value. In case where the wheel speed is changed by a specified value or more at any one wheel, the routine is diverted to S42 in which the timer is reset. In case where the wheel speed is not changed by more than a specified value, this condition is judged to be a normal grip condition and the routine goes to S43 in which the wheel speed difference between front left and right wheels is compared to a specified value. If the difference is within the specified value, the routine goes to S44 where the wheel speed difference between rear left and right wheels is compared to a specified value and if the wheel speed difference is within the specified value, the timer is counted up at S45. That is, if the wheel speed differences between left and right side for front and rear wheels are both within a specified value, it is judged that the vehicle runs in a straight-line condition. If not, the timer is reset at S42.

The routine after that is processed in the same manner as the step S15 of the flowchart shown in FIG. 10. That is, at S46 it is judged that the straight-line condition has been continued for more than a specified time and when at S47 it is judged that the wheel speed of the front wheels is higher than that of the rear wheels by more than a specified value, at S48 the rear wheels are judged to wear a tire chain. Further, when at S49 it is judged that the wheel speed of the rear wheels is higher than that of the front wheels, at S50 the front wheels are judged to wear a tire chain. On the other hand, if both wheel speeds are almost equal, the routine goes to S51 where no tire chain is worn and the timer is reset at S52. Thus, the tire chain wearing condition is properly judged only by the wheel speed.

In the aforementioned third and fourth embodiments, the tire chain wearing condition is checked. Next, when the front or rear wheels are judged to wear a tire chain, the correcting method of the target slip amount will be described using a flowchart shown in FIG. 11.

First, the tire chain wearing judgement is performed at S31 and it is judged whether or not the front wheels wear a tire chain at the next step S32. If yes, the routine is diverted to S33 and S34 where a large correction is made on the target slip amount δf of the front wheels and a small correction is made on the target slip amount δr of the rear wheels as shown in FIG. 7b.

As in this case, in case where the vehicle is operated on a snowy road or the like by the fourwheel drive with a tire chain wore only on the front wheels 11a and 11b, the rear wheels 11c and 11d whose grip force is small cause a slip. When a slip happens, the traction control operates so as to apply brake force to four wheels. In this case, since the front wheels 11a and 11b wear a tire chain and have a large grip force, weaker brake than in the first embodiment is applied thereto so as to increase the slip amount. On the other hand, the rear wheels 11c and 11d is controlled such that strong brake is applied thereto and a large side force due to the small slip amount is produced, thereby the vehicle is prevented from a slip tendency because of an extremely short grip force of the rear wheels with respect to the front wheels. Hence, in a tire chain wearing condition of the front wheels, the rear wheels are controlled so as to have a smaller slip amount than the front wheels and the vehicle running stability is improved in the same manner as in the first and second embodiments.

Figure 7C:
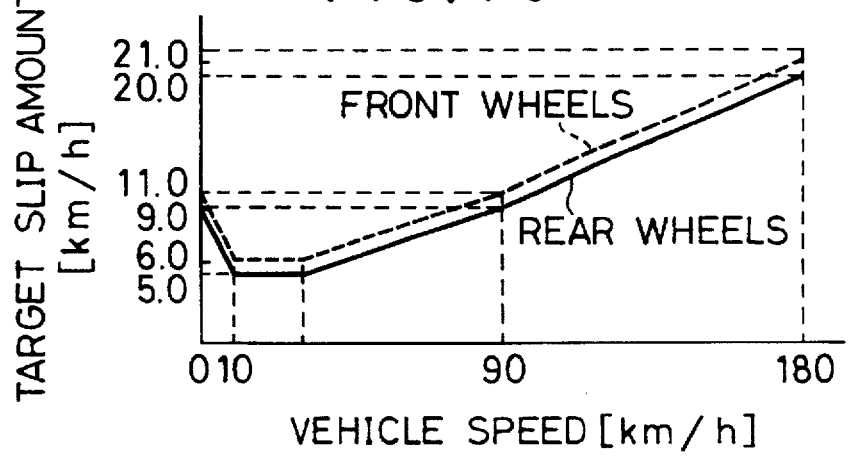
FIG. 7c is a diagrammatic chart showing a target slip amount of front and rear wheels versus vehicle speeds when a vehicle wears a tire chain on rear wheels.

In case where the rear wheels wear a tire chain, a large correction is made on the target slip amount δr and a small correction is made on the target slip amount δf of the front wheels as shown in FIG. 7c. When the vehicle is operated by the fourwheel drive on a snowy road with a tire chain wore on the rear wheels, the front wheels 11a and 11b whose grip force is small cause a slip and as a result the traction control is operated so as to apply brake to four wheels. In this case, a weak brake is applied to the rear wheels because of the tire chain and a strong brake is applied to the front wheels so as to reduce the slip amount, thereby the vehicle is prevented from a drift-out due to the shortage of grip force of the front wheels with respect to the rear wheels. Therefore, in a tire chain wearing condition of the rear wheels, the front wheels are controlled so as to have a smaller slip amount than the rear wheels and the vehicle running stability is improved in the same manner as in the first and second embodiments.

In the aforementioned embodiments, the traction control is made in accordance with the calculated slip amount and the calculated target slip amount, however, instead of the slip amount and the target slip amount, a calculated slip rate or calculated target slip rate may be used.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A traction control system of a fourwheel drive vehicle having an engine, a transmission, front wheels, rear wheels, a center differential for dividing a torque into said front and rear wheels, a front differential, a rear differential, front left and right wheels, a wheel speed sensor for detecting a wheel speed of each wheel of said front and rear wheels, a longitudinal acceleration sensor for detecting a longitudinal acceleration of said vehicle, a brake pressure control apparatus for independently controlling a brake pressure on said each wheel, an engine output control apparatus for controlling an output of said engine and a control unit for controlling said brake pressure control apparatus and said engine output control apparatus, comprising:

vehicle speed calculating means provided in said control unit for calculating a reference vehicle speed of said vehicle based on a lowest wheel speed in said wheels and said longitudinal acceleration;

slip amount calculating means provided in said control unit for calculating a slip amount of said each wheel based on said reference vehicle speed and said wheel speed of said each wheel;

target slip amount determining means provided in said control unit for determining a front target slip amount of said front wheels and a rear target slip amount of said rear wheels according to said reference vehicle speed;

traction control determining means provided in said control unit for determining to operate a traction control when said slip amount of said front wheels exceeds said front target slip amount or when said slip amount of said rear wheels exceeds said rear target slip amount and for outputting a traction control signal;

brake pressure calculating means provided in said control unit responsive to said traction control signal for calculating a brake pressure corresponding to a difference between said slip amount and said target slip amount and for outputting a brake pressure signal to said brake pressure control apparatus so as to apply a brake to said wheels; and engine output calculating means provided in said control unit responsive to said traction control signal for calculating a target engine torque corresponding to a difference between said slip amount and said target slip amount and for outputting a target engine torque signal to said engine output control apparatus.

2. The traction control system according to claim 1, further comprising:

tire chain detecting means provided in said control unit for detecting tire chain wearing wheels and tire chain not-wearing wheels based on said wheel speed of said each wheel and for outputting a tire chain wearing signal; and target slip amount correcting means provided in said control unit responsive to said tire chain wearing signal for correcting said target slip amounts of said target slip amount determining means so as to increase the target slip amount of said tire chain wearing wheels and to reduce the target slip amount of said tire chain not-wearing wheels.

3. The traction control system according to claim 1, further comprising:

a steering wheel angle detecting means for detecting a steering wheel angle;

tire chain detecting means provided in said control unit for detecting tire chain wearing wheels and tire chain not-wearing wheels based on said wheel speed of said each wheel and said steering wheel angle and for outputting a tire chain wearing signal; and target slip amount correcting means provided in said control unit responsive to said tire chain wearing signal for correcting said target slip amounts of said target slip amount determining means so as to increase the target slip amount of said tire chain wearing wheels and to reduce the target slip amount of said tire chain not-wearing wheels.

4. A traction control system of a fourwheel drive vehicle having an engine, a transmission, front wheels, rear wheels, a center differential for dividing a torque into said front and rear wheels, a differential limiting mechanism for producing a differential limiting torque between said front and rear wheels, a differential limiting torque control apparatus for controlling said differential limiting mechanism, a front differential, a rear differential, front left and right wheels, a wheel speed sensor for detecting a wheel speed of each wheel of said front and rear wheels, a longitudinal acceleration sensor for detecting a longitudinal acceleration of said vehicle, a brake pressure control apparatus for independently controlling a brake pressure on said each wheel, an engine output control apparatus for controlling an output of said engine and a control unit for controlling said brake pressure control apparatus and said engine output control apparatus, comprising:

vehicle speed calculating means provided in said control unit for calculating a reference vehicle speed of said vehicle based on a lowest wheel speed in said wheels and said longitudinal acceleration;

slip amount calculating means provided in said control unit for calculating a slip amount of said each wheel based on said reference vehicle speed and said wheel speed of said each wheel;

target slip amount determining means provided in said control unit for determining a front target slip amount of said front wheels and a rear target slip amount of said rear wheels according to said reference vehicle speed;

traction control determining means provided in said control unit for determining to operate a traction control when said slip amount of said front wheels exceeds said front target slip amount or when said slip amount of said rear wheels exceeds said rear target slip amount and for outputting a traction control signal;

brake pressure calculating means provided in said control unit responsive to said traction control signal for calculating a brake pressure corresponding to a difference between said slip amount and said target slip amount, for outputting a brake pressure signal to said brake pressure control apparatus so as to apply a brake to said wheels and for outputting a signal to nullify said differential limiting torque to said differential limiting torque control apparatus; and engine output calculating means provided in said control unit responsive to said traction control signal for calculating a target engine torque corresponding to a difference between said slip amount and said target slip amount and for outputting a target engine torque signal to said engine output control apparatus.

5. The traction control system according to claim 4, further comprising:

tire chain detecting means provided in said control unit for detecting tire chain wearing wheels and tire chain not-wearing wheels based on said wheel speed of said each wheel and for outputting a tire chain wearing signal; and target slip amount correcting means provided in said control unit responsive to said tire chain wearing signal for correcting said target slip amounts of said target slip amount determining means so as to increase the target slip amount of said tire chain wearing wheels and to reduce the target slip amount of said tire chain not-wearing wheels.

6. The traction control system according to claim 4, further comprising:

a steering wheel angle detecting means for detecting a steering wheel angle;

tire chain detecting means provided in said control unit for detecting tire chain wearing wheels and tire chain not-wearing wheels based on said wheel speed of said each wheel and said steering wheel angle and for outputting a tire chain wearing signal; and target slip amount correcting means provided in said control unit responsive to said tire chain wearing signal for correcting said target slip amounts of said target slip amount determining means so as to increase the target slip amount of said tire chain wearing wheels and to reduce the target slip amount of said tire chain not-wearing wheels.

* * * * *